March 12, 1968     W. SARAGA     3,373,272

ELECTRIC VECTOR PRODUCT GENERATOR

Filed Oct. 22, 1964

United States Patent Office

3,373,272
Patented Mar. 12, 1968

---

3,373,272
ELECTRIC VECTOR PRODUCT GENERATOR
Wolja Saraga, Orpington, Kent, England, assignor to Associated Electrical Industries Limited, London, England, a British company
Filed Oct. 22, 1964, Ser. No. 405,876
Claims priority, application Great Britain, Oct. 25, 1963, 42,229/63
5 Claims. (Cl. 235—194)

This invention concerns the provision of an electric vector product generator for the generation of electric vector products in real, that is three-dimensional, space. It is envisaged that such a generator may be used as an analogue for any physical phenomenon or mathematical expression based on the vector product of any vectors in three-dimensional space.

The concept of a general vector product generator implies that two input vectors, say P and Q, in any direction, can be accepted and that the corresponding vector product $R=(P \wedge Q)$, or complete information concerning the co-ordinates of R can be obtained. This result could, of course, be carried out by purely algebraic operations on the basis of the well-known expressions for the three co-ordinate components of R in terms of the three co-ordinate components of P and Q, namely:

$$R_x = P_y Q_z - P_z Q_y$$
$$R_y = P_z Q_x - P_x Q_z$$
$$R_z = P_x Q_y - P_y Q_x$$

Figure 1:
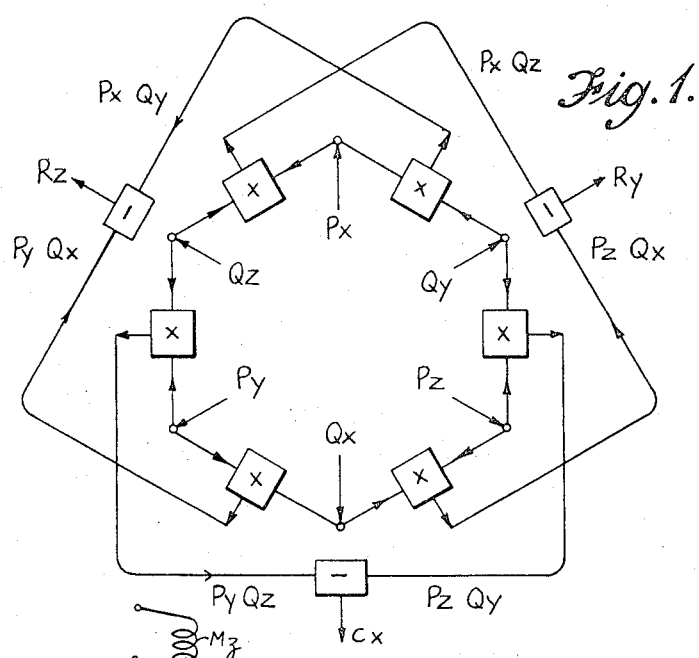

However, the electrical computation of $R_x$, $R_y$ and $R_z$ in corresponding manner would necessitate the use of a computation circuit arrangement comprising six separate multipliers and three subtractors. A block schematic diagram of such a computation arrangement is illustrated in FIG. 1 of the accompanying drawing. This block schematic diagram is thought to be self-explanatory and it is evident that for its satisfactory operation exact matching of the six multipliers is necessary.

It is an object of the present invention to provide an electric vector product generator which can effect such computation using only a single multiplying element.

The invention makes use of the Hall effect exhibited by a suitable conducting element, that is the effect by which, when a conducting element is carrying current and is subjected to a magnetic field transverse to the direction of the current, a voltage is produced between points on the element lying along a line transverse both to the current and to the field, the magnitude of the voltage being substantially proportional to the products of the components of the field and current at right angles to each other and to said line.

According to the present invention an electric vector product generator for generating in three co-ordinate directions in real space the three co-ordinate components of the vector product of two vectors, comprises a Hall effect body which is symmetrical along three mutually transverse axes and has three pairs of input/output electrodes respectively located along these axes for feeding to said body three co-ordinate electric current components representing the three co-ordinate components of one of said two vectors, together with magnetic means for subjecting said body to three co-ordinate magnetic components representing the three co-ordinate components of the other of said two vectors, the Hall effect body being effective by virtue of this effect to generate in dependence on the electric current density vector produced therein by the three electric current components and on the magnetic field strength vector produced by the three magnetic components, an electric field strength vector from which can be derived at the three input/output electrode pairs of the Hall effect body respective Hall output voltages representing the three co-ordinate components of the vector product of said two vectors.

Figure 2:
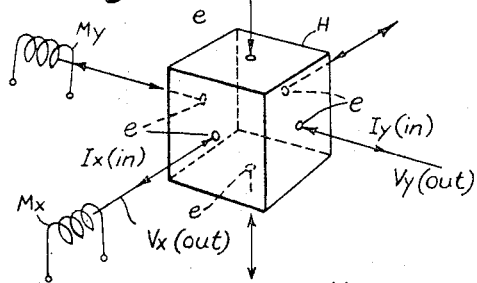
Figure 3:
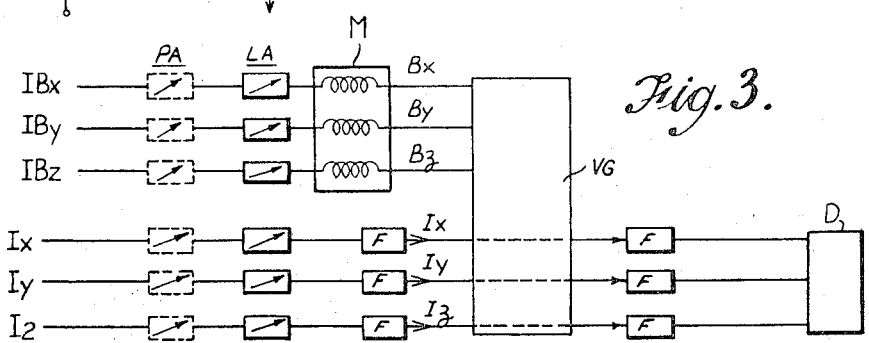

The nature and operation of a vector product generator according to the inventon may be better understood from the following description thereof given with reference to the remaining FIGURES 2 and 3 of the accompanying drawing, in which:

FIG. 2 illustrates diagrammatically an electric vector product generator conforming to the invention having a cube-shaped Hall effect body; and FIG. 3 illustrates diagrammatically an analogue vector computation arrangement employing an electric vector generator conforming to the invention.

Referring to FIG. 2, the vector product generator there shown has a cube-shaped Hall effect body H which has an input/output electrode e at each of its six surfaces, the six electrodes e thus provided forming three pairs each composed of the two electrodes on opposite surfaces of the cube. Three coils $M_x$, $M_y$ and $M_z$ represent magnetic means for producing three co-ordinate magnetic components to which the Hall effect body H is subjected. The coils $M_x$, $M_y$ and $M_z$ are shown aligned respectively with the pairs of electrodes e at the surfaces of the Hall effect body H along three mutually perpendicular axes through the Hall effect body H, the three magnetic components being produced along these axes respectively. However, alignment between the coils $M_x$, $M_y$ and $M_z$ and the electrode pairs e is not essential for the functioning of the generator.

Basically, the Hall effect body H can provide, by virtue of the Hall effect, a Hall output voltage V from an electric field strength vector E which generated therein and is proportional to the vector product of a magnetic field strength vector B produced on magnetisation of the magnetic means and an electric current density vector J transversing the Hall effect body H and produced therein by the application of input current I to the electrodes e. The vector product generator as a whole has provision for the application thereto of arbitrary input vectors B and J and for the extraction therefrom of Hall output voltages derived from and affording information about the electric field strength vector E. To achieve this, the coils $M_x$, $M_y$ and $M_z$ are suitably magnetised so that magnetic components $B_x$, $B_y$ and $B_z$ for producing the magnetic field strength vector B are applied in the directions of the three co-ordinate axes and electric current components $I_x$, $I_y$ and $I_z$ for producing the electric current density vector J are applied to the Hall effect body H in these same directions by the application thereof to the input/output electrode pairs e. As a result, by virtue of the Hall effect, three co-ordinate Hall output voltage components $V_x$, $V_y$ and $V_z$ coresponding to the components of the resulting electric field strength vector E will appear respectively at the three input/output electrode pairs e. As the electric current components $I_x$, $I_y$ and $I_z$ are also present at these electrode pairs e, it is necessary to use electric current components and magnetic components which produce an electric field strength vector E having characteristics, such that the Hall output voltage components derived therefrom can be easily separated from the electric current components. This can, in principle, be done on the basis of the shape of these components considered as functions of time, or on the basis of the frequency of the components. For example, in respect of the latter method assume that the magnetic components $B_x$, $B_y$ and $B_z$ are of the form $\cos \omega_1 t$ and the electric current components $I_x$, $I_y$ and $I_z$ are of the form $\cos \omega_2 t$. Then the Hall output voltage components $V_x$, $V_y$ and $V_z$ will be of the form:

$$\cos \omega_1 t \cos \omega_2 t = \tfrac{1}{2}[\cos(\omega_1+\omega_2)t + \cos(\omega_1-\omega_2)t]$$

Discrimination between these wanted Hall output voltage components of this form and the unwanted electric current components of the form cos $\omega_2 t$ is required and can be achieved by means of selective circuits. Of particular interest are the following cases:

(1) $\qquad \omega_1 \gg \omega_2$

In this case both $(\omega_2+\omega_1) \gg \omega_2$ and $-(\omega_2-\omega_1) \gg \omega_2$. Therefore the Hall output voltage components can easily be separated from the electric current components of the form cos $\omega_2 t$ by means of a simple filter.

(2) $\qquad |\omega_1-\omega_2| \ll \omega_2$

In this case the Hall output voltage components of the form cos $(\omega_1-\omega_2)t$ can again be separated from the electric current components by means of a simple filter. Also in this case it follows that $\omega_1+\omega_2 \doteq 2\omega_2$. Therefore the Hall output voltage components of the form cos $(\omega_1+\omega_2)t$ can also be selected, that is separated from the electric current components, by means of a comparatively simple filter. Three special cases are of interest:

(a) $\omega_2=0$, that is the electric current components are D.C. signals. This is a special case of (1), in which the Hall output voltage components have the angular frequency $\omega_1$ and can easily be separated from the D.C. electric current components.

(b) and (c) $\omega_1=\omega_2$; this is a special case of (2). In this case either D.C. Hall output voltage components or double frequency Hall output voltage components can be obtained.

Thus, for example, if the specified co-ordinate components of two input vectors P and Q are:

$$P_x=2, P_y=3, P_z=-4$$
$$Q_x=5, Q_y=-6, Q_z=7$$

so that the co-ordinate components of the vector product R should be determined as:

$$R_x=P_y Q_z-P_z Q_y=(3 \times 7)-(-4 \times -6)=-3$$
$$R_y=P_z Q_x-P_x Q_z=(-4 \times 5)-(2 \times 7)=-34$$
$$R_z=P_x Q_y-P_y Q_x=(2 \times -6)-(3 \times 5)=-27$$

it will be necessary to apply, corresponding to the specified P and Q values, electric current and magnetic components of the form:

$$I_x=2 \cos \omega_1 t, I_y=3 \cos \omega_1 t, I_z=-4 \cos \omega_1 t$$
$$B_x=5 \cos \omega_2 t, B_y=-6 \cos \omega_2 t, B_z=7 \cos \omega_2 t$$

where $\omega_1$ and $\omega_2$ are chosen as discussed above.

In principle, the required Hall output voltage components could also be obtained by subtracting the electric input current components from the total output current as derived from the Hall output voltage components, or by balancing it against it. However, in practice a separation on a frequency basis appears more attractive.

The separation of the Hall output voltage components from electric current components by means of frequency or shape selection may not be necessary in special purpose vector product generators, in which a Hall output voltage component in the direction of a possible electric current component is never required. For example, the Hall effect device employed in the arrangements described in United States application No. 160,746 is a special purpose vector product generator, in which both the electric current density vector (J) and the magnetic field strength vector (B) always lie in the same common plane so that the electric field strength vector (E) produced thereby and thus the Hall output voltage components derived therefrom are always in a direction perpendicular to this common plane. Thus, no input current component producing the electric current density vector lies in the direction of the Hall output voltage components.

It will be appreciated that it may sometimes be possible to use the information bearing signals themselves as the input components, if their frequency relationship or their directions permit separation of the Hall output voltage components from these signals when serving as electric current input components.

For instance, if in the example previously given $P_z=0$ and $Q_z=0$, then $R_x=0$ and $R_y=0$, so that the vector product R has only a component $R_z$ and thus only the Hall output voltage component $V_z$ would be produced. In this case, therefore, it is not necessary for the input signals to amplitude-modulate the "carrier" signals cos $\omega_1 t$ and cos $\omega_2 t$ and these input signals may be used directly for the magnetic and electric current co-ordinate components. Thus, these components in correspondence with the specified P and Q values of the previous example would be:

$$I_x=2, I_y=3 \text{ and } B_x=5, B_y=-6$$

In the analogue vector computation arrangement shown in FIG. 3, the rectangle H represents the Hall effect body of the vector product generator according to the invention which is subjected to the three co-ordinate magnetic components $B_x$, $B_y$ and $B_z$ as produced by the magnetic means M of the generator in response to suitable magnetising currents $IB_x$, $IB_y$ and $IB_z$. The three electric current components $I_x$, $I_y$ and $I_z$ are applied to the Hall effect body. Adjustment of the phase of each of these six components, if required, is possible by means of an individual phase adjustment circuit PA and adjustment of its level is possible by means of an individual level adjustment circuit LA. In response to these input components, the vector product generator H operates to produce the three co-ordinate Hall output voltage components $V_x$, $V_y$ and $V_z$ as already described. Individual filters F may be provided for the separation of the components $V_x$, $V_y$ and $V_z$ from the electric current (input) components $I_x$, $I_y$ and $I_z$ when, as aforesaid, these input and output components appear together at the common input/output electrodes of the Hall effect body of the vector product generator.

The values of the output voltage components $V_x$, $V_y$ and $V_z$ can be displayed in any desired way, for example on voltmeters, on the screens of cathode ray oscilloscopes, or by means of the dial settings of suitable means for balancing these voltage components by a null technique. The rectangle D represents the means for achieving this.

The filters F and the level adjustment circuits LA may take any suitable known form well known in the art. The individual phase adjustment circuits PA may be of similar form to the phase shifters described in the article "An Aerial Analogue Computer," Journal of the Brit. I.R.E. vol. 13, Number 4, April 1953. (W. Saraga et al.).

What I claim is:

1. An electric vector product generator for generating in three coordinate directions in real space the three co-ordinate components of the vector product of two vectors, said generator comprising a Hall effect body which is symmetrical along three mutually transverse axes and has three pairs of input/output electrodes respectively located along these axes for feeding to said body three co-ordinate electric current components representing the three co-ordinate components of one of said two vectors, magnetic means for subjecting said body to three co-ordinate magnetic components representing the three co-ordinate components of the other of said two vectors, the Hall effect body being effective by virtue of this effect to generate in dependence on the electric current density vector produced therein by the three electric current components and on the magnetic field strength vector produced by the three magnetic components, an electric field strength vector from which can be derived at the three input/output electrode pairs of the Hall effect body respective Hall output voltages representing the three co-ordinate components of the vector product of the said two vectors.

2. An electric vector product generator as claimed in claim 1, wherein said Hall effect body is cube-shaped and has an input/output electrode at each of its six surfaces, the six electrodes thus provided constituting said three electrode pairs each composed of two of the electrodes at opposite surfaces of the cube.

3. An electric vector product generator as claimed in claim 1, in combination with means for adjusting the phase of each of the co-ordinate electric current and magnetic components prior to their application to the generator.

4. An electric vector product generator as claimed in claim 1, in combination with means for adjusting the level of each of the co-ordinate electric current and magnetic components prior to their application to the generator.

5. An electric vector product generator for generating in three co-ordinate directions in real space the three co-ordinate components of the vector product of two vectors, said generator comprising a Hall effect body which is symmetrical along three mutually transverse axes and has three pairs of input/output electrodes respectively located along these axes for feeding to said body three co-ordinate electric current components representing the three co-ordinate components of one of said two vectors, magnetic means for subjecting said body to three co-ordinate magnetic components representing the three co-ordinate components of the other of said two vectors, the Hall effect body being effective by virtue of this effect to generate in dependence on the electric current density vector produced therein by the three electric current components and on the magnetic field strength vector produced by the three magnetic components, an electric field strength vector from which can be derived at the three input/output electrode pairs of the Hall effect body respective Hall output voltages representing the three co-ordinate components of the vector product of the said two vectors, means for adjusting the phase of each of the co-ordinate electric current and magnetic components prior to their application to the generator, means for adjusting the level of each of the co-ordinate electric current and magnetic components prior to their application to the generator, and filter means for separation of the co-ordinate electric current components applied to the input/output electrode pairs of the Hall effect body from the Hall output voltages produced thereat.

No references cited.

DAVID X. SLINEY, *Primary Examiner.*